July 12, 1966  G. C. JONES  3,260,236
ANIMAL MAZE
Filed April 6, 1964

INVENTOR.
GRANT C. JONES
BY Fulwider, Patton, Rieber,
Lee, and Utecht
ATTORNEYS

United States Patent Office 3,260,236
Patented July 12, 1966

3,260,236
ANIMAL MAZE
Grant C. Jones, 1617 Maple Ave., Torrance, Calif.
Filed Apr. 6, 1964, Ser. No. 357,473
1 Claim. (Cl. 119—1)

The present invention relates to an animal maze for studying the behavior of animals exposed to various sensory stimuli, and more particularly to such an animal maze for popular use by laymen and the like.

Heretofore, those interested in the serious study of animal behavior in a maze or labyrinth have either had to purchase a rather elaborately constructed and consequently expensive maze of the type designed for use by large research institutions or the like, or have had to resort to self-constructed or homemade mazes which because of their haphazard construction introduce unwanted variables detracting from accurate analysis of animal behavior. Youngsters with pets such as snakes, lizards, turtles, rats, mice, guinea pigs, and hamsters are not able to advance their understanding of the behavior of these creatures and the reasons for such behavior in the absence of a relatively inexpensive, multi-purpose animal observation device or maze. The scientific supply houses, pet supply shops, and scientific toy manufacturers do not presently offer a practical and serviceable device of this character for use in educating children and lay adults to the interesting variants in the behavior of animals subjected to such sensory stimuli as light, sound, heat, movement, touch, and smell in a controlled environment such as a maze.

Accordingly, it is an object of the present invention to provide an animal maze which is relatively inexpensive and easily constructed, particularly by youngsters interested in studying animal behavior beyond the elemental aspects of their care and feeding.

Another object of the invention is the provision of such an animal maze which is constructed of sheet material components adapted to lie flat in their unassembled state for inexpensive packaging, handling, and shipment, but which are also adapted by an arrangement of interfitting projections and openings to be quickly assembled into a maze. A related object is to provide the base and walls of the maze with a coating of a waxy or similar material which renders the maze non-toxic, non-injurious, odor-free, water-resistant, chemically non-absorbant, smooth to the touch, and characterized by low heat conductivity. The coating material renders the maze easy to keep clean and reduces the number of variables or parameters affecting the behavior of the animal.

Another object of the invention is to provide a maze of the aforementioned character which is adapted to permit the study of a comparatively large number of species of animals including crustacea, fish, and similar creatures who live in water.

Other objects and features of the invention will become apparent from consideration of the following description taken in connection with the accompanying drawings, in which.

Figure 1:
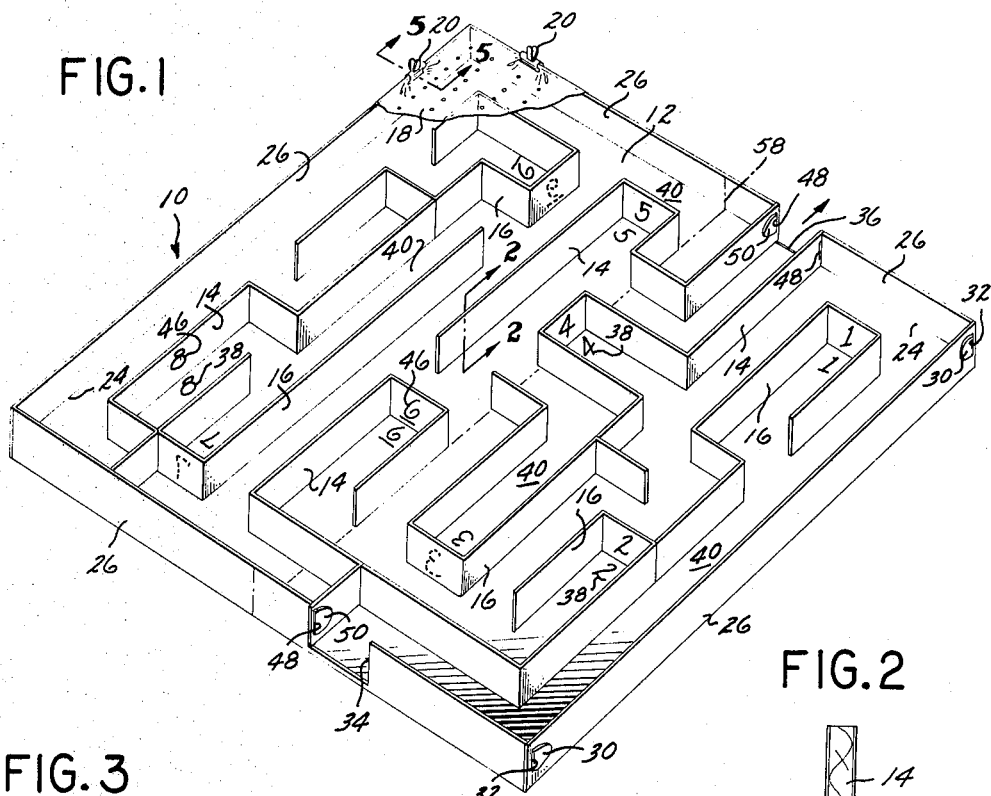
FIG. 1 is a perspective view of an animal maze according to the present invention, a portion of the cover therefor being removed for clarity.

Referring now to the drawings, there is illustrated an animal labyrinth or maze 10 which comprises, generally, a horizontally oriented base 12, a plurality of upstanding inserts 14 and 16 arranged upon the base 12 to define a network of intercommunicating passageways, a perforated sheet 18 adapted to overlie the base 12, and a plurality of fastening means or clips 20 adapted to secure the sheet 18 in position.

As will be seen, the maze 10 is constructed so that it may be quickly and easily assembled and disassembled for repeated use, and is preferably made of relatively inexpensive materials so that it can be marketed at prices low enough to bring it within the means of the general public, particularly youngsters having small animal pets.

Accordingly, the base is preferably constructed of the cardboard material which is widely available and used in great quantities for shipping cartons and the like. It is light in weight, has appreciable strength, and can be folded, particularly when pre-creased. The opposite faces of the planar base, and particularly the upper sides thereof are provided with any suitable coating 21 which is non-toxic, odor-free, a low heat conductor, water-resistant, chemically non-absorbant, smooth to the touch, and preferably non-magnetic and electrically non-conductive. A number of so-called plastic materials are readily available as such a coating, as well as waxy materials such as paraffin and the like.

The base 12 may be provided with any number of sides but is preferably of rectangular configuration and includes indicia thereon, preferably taking the form of printed lines thereon (not shown) which define a network of intercommunicating paths. In FIG. 1 the indicia lies beneath the lower edges of the inserts 14 and 16 and, as will be apparent, facilitates the proper location of such inserts. The indicia or lines may be both solid and dotted to apprise the user of the location of the inserts, particularly where the inserts abut and it is not apparent which way the inserts should be bent. However, it will be obvious that any type of indicia for this purpose will be satisfactory.

Figure 2:
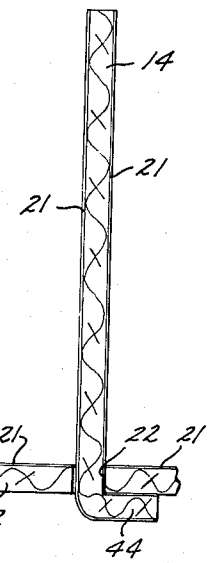
FIG. 2 is an enlarged detail view taken along the line 2—2 of FIG. 1.
Figure 3:
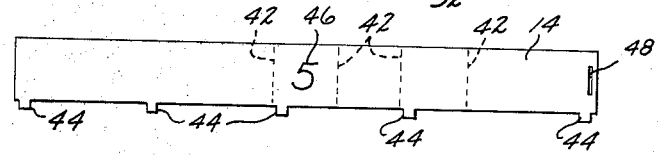
FIGS. 3 and 4 are side elevational views of the two types of inserts utilized in the present embodiment, and showing the location of the transverse creases therein facilitating folding of the inserts.
Figure 4:
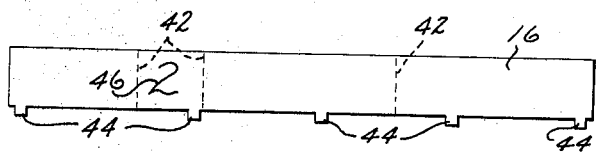
Figure 5:
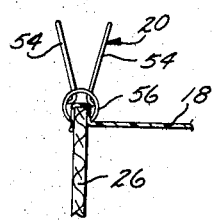
FIG. 5 is an enlarged detail view taken along the line 5—5 of FIG. 1.

The base 12 is devoid of surface irregularities except for a plurality of openings or slots 22 therethrough, as best seen in FIG. 2, which are spaced along the lines upon which the inserts 14 and 16 rest. The purpose of the slots 22 will be described subsequently in connection with the assembly of the maze 10.

The base 12 also includes creases 24 spaced from and parallel to the sides of the base 12, respectively, whereby the base is bendable along the creases 24 to form four upstanding side walls 26 for the base. In addition, the base is provided adjacent the extremities of the side walls 26 and creases 24 with cutout portions which define complemental bayonet tongues or tabs 30 and notches 32 for securement together to maintain the side walls 26 in upstanding relationship to the base 12.

A pair of the side walls 26 include, respectively, a pair of openings constituting an entry 34 and an exit 36 providing a means for animals to enter and leave the maze 10.

The base 12 also includes additional indicia in the form of numerals 38, each distinguishable from the other numerals 38, as will be apparent, which facilitates proper location of the inserts 14 and 16 on the base during the assembly of the maze 10.

The inserts 14 and 16 are elongated and have parallel upper and lower edges, and end edges normal to the upper and lower edges so that the inserts are adapted to form labyrinthine walled passageways 40 coextensive with the network of intercommunicating paths defined by the base indicia upon which the inserts rest. The inserts 14 and 16 are preferably made of the same material as the base 12 and are also preferably coated on both sides with the same kind of protective coating 21, and for the same purpose.

The inserts 14 and 16 are transversely bendable to form the right-angular interconnecting passages, and for this purpose are provided with a plurality of transverse creases 42 to facilitate folding or bending of the inserts at predetermined locations, it being noted that the particular labyrinthine pattern of the present made 10 is best formed by two types of inserts, that is, the inserts 14 and 16. These inserts are substantially identical except for the location of a plurality of locating projections or tabs 44 provided along the lower edges thereof, and except for the location of the creases 42, which varies from one insert to the next. However, it will be apparent that the number of types of inserts and the location of the creases 42 are not critical to the present invention, the arrangement illustrated being merely exemplary.

The tabs 44 are adapted for receipt or insertion into the slots 22 in the base 12 whereby the inserts define the walled passageways 40. The tabs 44 may protrude below the base 12 or may be bent over if desired, as illustrated in FIG. 2. Proper orientation or location of the inserts 14 and 16 is facilitated not only by the provision of the indicia outlining the labyrinthine path, but also by indicia in the form of numerals 46 provided on the inserts and which are complemental to the numerals 38 provided on the base 12. The inserts are properly oriented when the numerals 38 and 46 are matched.

The extremities of those of the inserts 14 and 16 adjacent the entry 34 and the exit 36 are provided with slots, as indicated at 48 in FIG. 1, and the one side wall edge defining the entry 34, and both of the side wall edges defining the exit 36 are provided with integral flaps or bayonet tongues 50 which complementally fit within the slots 48 to firmly secure the inserts to the side walls 26.

The sheet 18 is preferably a rectangular flexible film of plastic material or the like which is transparent and adapted to overlie the base 12 in engagement with the upper edges of the side walls 26 and the inserts 14 and 16. For certain experiments an opaque sheet 18 may be substituted.

The sheet 18 is provided with a plurality of apertures or perforations 52 for ventilation of the interior of the passageways 40 so that an animal in the maze can breathe without difficulty. The sheet 18 is coextensive with the upper edges of the side walls 26 and is secured thereto by any suitable fastening means such as by the plurality of clips 20, which are each characterized by a pair of spaced gripping elements 54 urgeable together to spread apart a slotted tubular member 56 for releasing the edge of the sheet 18. Normally the resilience of the tubular member 56 causes the slot margins thereof to engage and secure the sheet 18 in position upon the upper edges of the walls 26.

A variety of animal activities may be studied by utilizing the maze 10. Light may be trained through the transparent sheet 18 to train the animal or study its response to light; the maze may be placed upon a revolving turntable; and various objects characterized by peculiar shapes, tastes, or smells may be placed in the passageways 40 and the animal's reactions studied. Crustacea and fish may be studied as well by placing an inexpensive plastic film drop cloth so that it depends into the passageways 40. The passageways can then be filled with water, and fish released to explore the labyrinth. Many other types of experiments will immediately suggest themselves to those utilizing the maze, and the examples given are merely set forth to demonstrate the variety of activities for which the present maze 10 is adapted.

From the foregoing it will be apparent that a knockdown maze 10 has been provided which is quickly and easily assembled and which is made of inexpensive materials so that it is well within the means of the general public. The nature of the connections between the various components of the maze 10 permits the maze to be quickly disassembled as well. The inserts 14 may be laid flat upon one-half of the base 12, the sheet 18 folded and laid upon the stacked inserts, and the base 12 folded at its middle along a precrease 58 provided in the upper surface thereof to thereby provide a compact, easily stored package.

Various modifications and changes may be made with regard to the foregoing detailed description without departing from the spirit of the invention or the scope of the following claim.

I claim:

an animal maze comprising:
a multi-sided bendable base having indicia thereon defining a network of intercommunicating paths, said base including openings therethrough spaced along said indicia, said base further including creases spaced from and parallel to the sides of said base, respectively, and cut-out portions adjacent the extremities of said creases whereby said base is bendable along said creases to form upstanding side walls for said base, said cut-out portions defining complemental tabs and notches for securement together to maintain said side walls in upstanding relationship to said base, a pair of said side walls including, respectively, a pair of openings providing entry to and exit from said paths;
a plurality of elongated bendable inserts having projections along the lower edges thereof adapted for insertion into said openings along said indicia whereby said inserts define walled passageways coextensive with said paths, the extremities of those of said inserts adjacent said pair of entry and exit openings and at least one of the side wall edges of said pair of entry and exit openings being provided with complemental tabs and notches for securement together thereof;
and a perforated sheet adapted to be fixed to the upper edges of said side walls to prevent escape of animals from said passageways.

References Cited by the Examiner

UNITED STATES PATENTS

| | | | |
|---|---|---|---|
| 1,609,696 | 12/1926 | Cleveland. | |
| 2,422,438 | 6/1947 | Richards | 119—19 |
| 2,563,608 | 8/1951 | Laufer | 273—109 |
| 3,154,052 | 10/1964 | Sweeney | 119—1 |

SAMUEL KOREN, *Primary Examiner.*

HUGH R. CHAMBLEE, *Examiner.*